Nov. 14, 1933.  R. L. O'CONNOR  1,934,876
LIFTING TOOL
Filed May 11, 1932   2 Sheets-Sheet 1
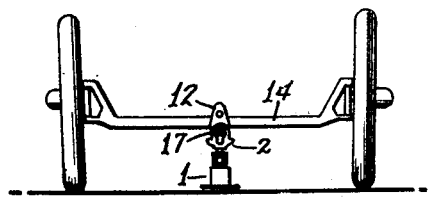
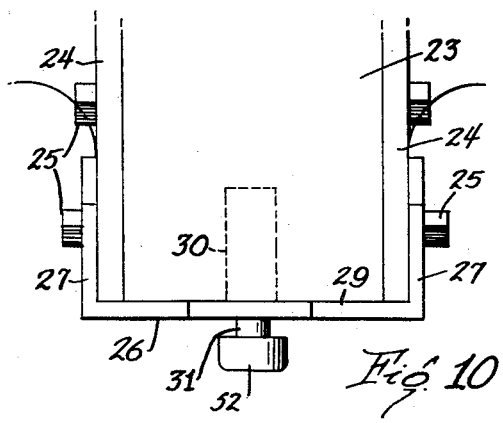
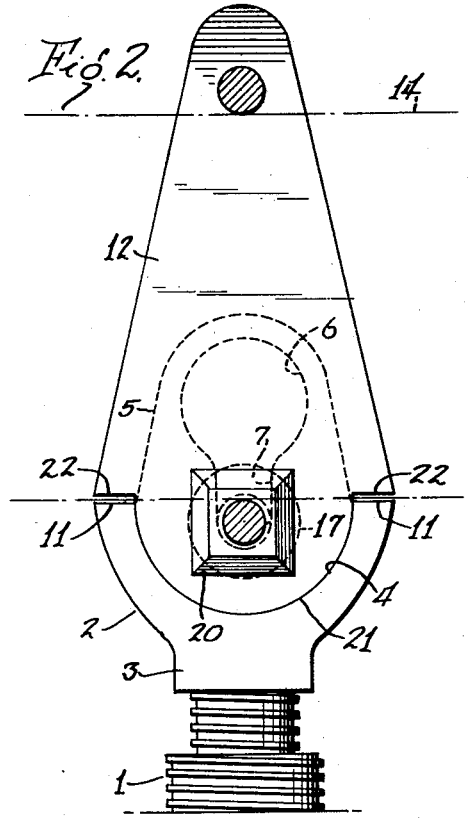
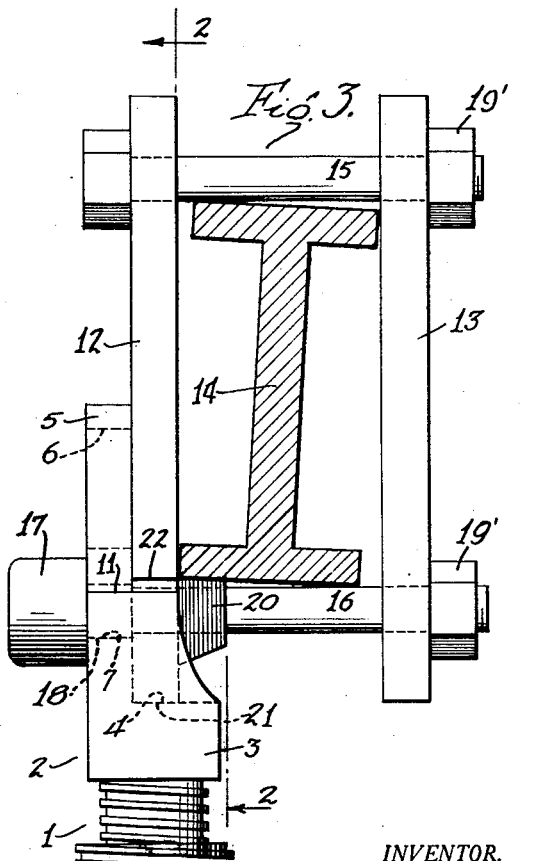
INVENTOR.
RAYMOND L. O'CONNOR
BY
ATTORNEYS.

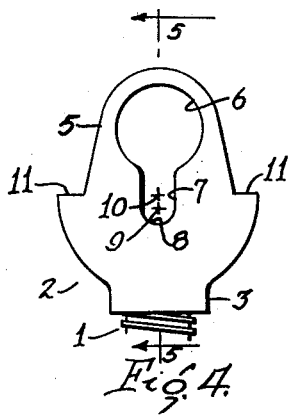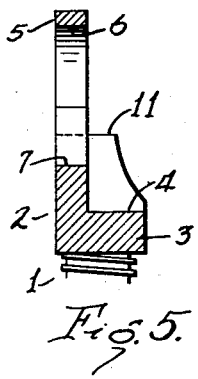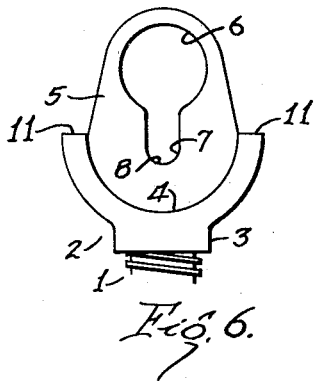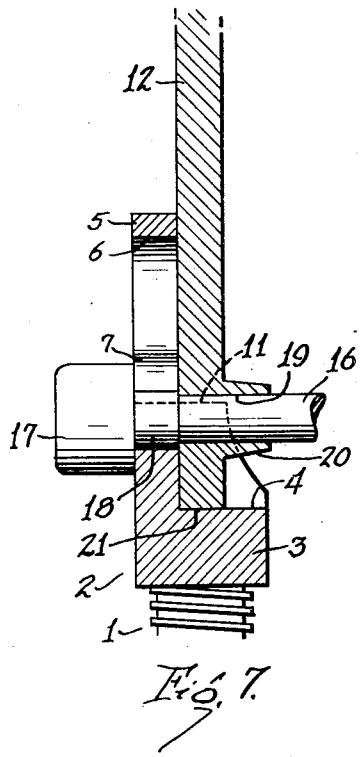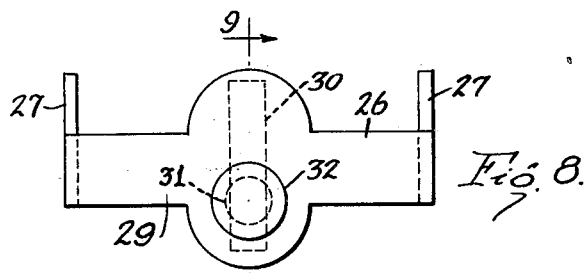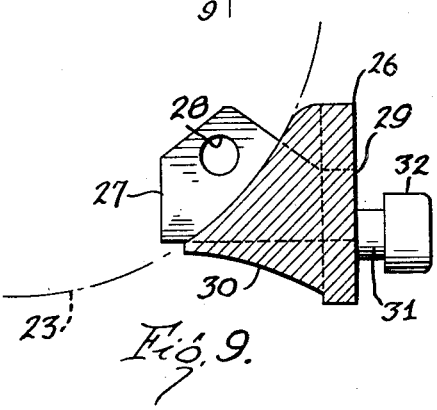

Patented Nov. 14, 1933

1,934,876

UNITED STATES PATENT OFFICE 1,934,876

LIFTING TOOL

Raymond L. O'Connor, Berkeley, Calif.

Application May 11, 1932. Serial No. 610,689

9 Claims. (Cl. 254—133)

The present invention relates to improvements in lifting tools, and more particularly in the ordinary jack used commonly for the lifting of the front or rear axle of an automobile when it becomes necessary to change a tire or to perform some other mechanical operation.

The lifting tools or jacks used at the present time are first set on the ground surface underneath the axle or other part to be lifted, whereupon through some suitable mechanism the head of the jack is raised to make contact with the axle and on further movement to raise the axle. The proper placing of the jack in many cases is a rather difficult task, particularly when the motor vehicle stands on a grade. Furthermore the hold of the jack on the axle is precarious in many cases, and it has happened that operators engaged in repair work were seriously injured by the slipping of a jack.

In the present invention it is proposed to provide an improved lifting tool or jack that may be easily applied to the axle of a vehicle or any other object, and which at all times during use is firmly connected to the axle so that it cannot possible slip.

More particularly it is proposed to provide coacting means between the axle and the jack whereby the jack may be suspended from the axle for initial engagement and made to contact the ground surface upon extension of the jack by conventional means, while further extension of the jack serves to first establish lifting contact between the jack and the axle, and then a lifting movement of the axle.

Further objects and advantages of my invention will appear as the specification proceeds.

The preferred form of my invention is illustrated in the accompanying drawings in which Figure 1 shows a front view of a wheel-supported axle having my jack attached thereto;

Figure 2 a vertical section taken along line 2—2 of Figure 3;

Figure 3 a longitudinal vertical section through a front axle having my device attached thereto, only the upper portion or head of the jack being shown;

Figure 4 a detail view in front elevation of the head of my jack;

Figure 5 a vertical section taken along line 5—5 of Figure 4;

Figure 6 a rear view of the jack head;

Figure 7 a fragmentary vertical section through the jack head in engagement with front axle fastening means;

Figure 8 a rear view of a fitting for my jack used in connection with a rear axle arrangement;

Figure 9 a vertical section taken along line 9—9 of Figure 8; and

Figure 10 a top plan view of the fitting attached to the differential housing of a motor vehicle.

While I have shown only the preferred forms of my invention I wish to have it understood that various changes or modifications may be made within the scope of the claims hereto attached without departing from the spirit of the invention.

In its preferred form my invention comprises a jack 1 of any suitable form provided with a head 2 which is illustrated in detail in Figures 4, 5, and 6. The head comprises a base 3 formed to provide a substantially semi-circular bed or lifting surface 4, and a guide plate 5 rises vertically from the base in front of the bed 4, the guide plate being formed in its upper portion with a circular hole 6 communicating with a downwardly extending slot 7, the lower margin of which is rounded as at 8. For the purposes of my invention, the circle of the bottom edge of the slot might be concentric with the bed 4 so that the bottom of the slot and the bed would cooperate in carrying the load, but I preferably lengthen the slot 7 so that the center of its bottom edge indicated at 9 is somewhat below the center 10 on which the bed plate is formed so that all the actual lifting is done by the bed plate. The upper edges of the bed are made to form shoulders 11 with the guide plate.

For proper use my lifting jack requires coaction of a specially prepared member on the axle or whatever object is to be lifted, and this part may be formed integrally with the axle, or may be an extra part made for easy attachment. I prefer the latter method, and I show in my drawings two attachments, one being made for the front axle and the other for a conventional rear axle, it being understood, of course, that different shapes of axles will call for different forms of attachments. In Figures 2, 3 and 7 I show a front axle attachment adapted for cooperation with my lifting jack. This attachment comprises a front member 12 and a rear member 13 adapted to engage the axle 14 from opposite sides and adapted to be fastened upon the axle by means of two bolts 15 and 16. The lower bolt 16 is made for my particular purposes and includes a head 17 and an enlarged portion 18 which latter is too heavy to pass through the aperture 19 in the front plate 12, and which therefore spaces the head 17 from the front plate. The length of this heavier section 18 corresponds to the thickness of the plate 5 of the jack head. The two bolts 15 and 16 are held in place by means of nuts 19' and the front plate 12 is preferably formed with a boss 20 adjacent the opening 19, this boss serving to compensate for the conventional slightly inclined position of the front axle, the object of this boss being to position the plate 12 in a vertical plane, and more particularly to make certain that the bolt 16 is in a horizontal plane.

The front plate 12 is preferably made in the tapered form shown in Figure 2, and its bottom edge 21 is rounded on the same radius as the bed 4 of the jack head so as to fit thereon in a manner shown in Figure 2. The side edges of the plate 12 are formed with shoulders 22 which, when the jack is in lifting position, are slightly spaced from the shoulders 11 of the jack head so as to allow of limited rocking movement of the plate 12 relative to the jack head. The center of the bolt hole 19 lies in the same vertical plane as the center of the rounded bottom 21 but is preferably arranged so that the face 21 makes contact with the bed 4 before the bolt reaches the bottom of the slot 7.

The general assembly about a front axle is shown in Figure 1, from which it appears that in use the jack is first suspended from the bolt 16, the head 17 of the bolt passing through the hole 6 in the jack head, and the jack then being lowered so that the hole or eye 6 comes to rest on the widened portion of the bolt 18 in front of the plate 12, between the bolt head 17 and the front plate. It will be readily seen that this is a very easy operation, it being much simpler to merely suspend the jack from the button or bolt than to position the jack on the ground surface in the conventional manner. After the jack has thus been suspended from the bolt 16 the jack is extended by any suitable mechanism until the base of the jack strikes the ground surface. On further extension the head of the jack will travel upward, the slot 7 in the jack head allowing of such upward travel until the bottom of the plate 12 strikes the bed 4 of the jack head and is lifted thereby. I prefer to arrange the slot and bed in such a manner that the bed 4 does the actual lifting, while the slot or rather the plate 5 serves as a mere guide member, although it should be understood that by a slightly different construction the bolt may be made to carry part of the load. It would even be possible to change the construction so as to make the bolt carry the entire load without departing from the spirit of the invention.

It will be noted from Figure 1 that the attachment is fastened to the center of the front axle and that therefore both front wheels are lifted at the same time in perfectly balanced relation. The shoulders 11 and 12 allow of a certain amount of rocking motion between the attachment and the jack head, which is particularly important where the machine or automobile is parked in an inclined position, in which case the jack first lifts the lower one of the two wheels until it reaches the elevation of the second wheel, whereupon the two wheels are raised simultaneously and maintain their balance.

For the rear axle a somewhat different attachment has to be used on account of the different shape. One well known car provides a cylindrical axle housing 23 with side plates 24 bolted thereto as at 25, and in that particular make I preferably use the fitting illustrated in Figures 8, 9 and 10, comprising a U-shaped member 26, the flanges 27 of which are made to fit over the rear axle housing and are formed with holes 28 by means of which the fitting may be held in place through the bolts 25. The rear or body section 29 of the U-shaped member is held in vertical position by means of a web 30 fitting against the curved face of the cylindrical housing as shown in Figure 9. The rear member 29 has a pin 31 projecting therefrom with a head 32, this pin and head corresponding to the bolt 16 of the front axle arrangement, and being adapted for engagement by the head of the jack.

I claim:

1. In combination, a liftable object having a pin projecting therefrom with a head on the pin in spaced relation to the object and a jack having an eye adapted to pass over the head for suspending the jack from the pin, the eye having a slot communicating therewith for allowing the lifting element of the jack to ride upward on the pin through a limited distance before exerting lifting effect.

2. A vehicle axle having a pin projecting therefrom in the central longitudinal plane of the vehicle whereby both sides of the vehicle may be raised simultaneously in balanced relation.

3. In combination, a vehicle axle having a pin projecting horizontally therefrom, a jack having a head with an eye therein by means of which it may be suspended from the pin, a slot communicating with the eye and allowing the head to travel upward on the pin and coacting surfaces on the head and the axle for taking the load when the head is lifted a certain distance.

4. A jack for a liftable object having means for supporting the same in spaced relation to a fixed surface, the jack having a lifting head, means for suspending the head from the object with freedom of upward movement of the head, and coacting faces on the object and the head for taking the load of the object when the head is lifted.

5. A jack for a liftable object having means for supporting the same in spaced relation to a fixed surface, the jack having a lifting head, means for suspending the head from the object with freedom of upward movement of the head, and coacting faces on the object and the head for taking the load of the object when the head is lifted, the coacting faces being rounded to allow of rocking motion of the object relative to the head.

6. A jack for a liftable object having means for supporting the same in spaced relation to a fixed surface, the jack having a lifting head, means for suspending the head from the object with freedom of upward movement of the head, and coacting faces on the object and the head for taking the load of the object when the head is lifted, the coacting faces being rounded to allow of rocking motion of the object relative to the head and having means associated therewith for limiting the rocking motion.

7. A jack for a liftable object having means for supporting the same in spaced relation to a fixed surface, the jack having a lifting head, and coacting lifting faces on the object and the head shaped to allow of rocking motion of the object relative to the head, with means for preventing axial and tilting movement in an axial direction between the object and the head.

8. A lifting jack having a lifting head with an eye therein whereby it may be suspended, and a slot extending from the eye in a downward direction.

9. A lifting jack having a lifting head with an eye therein whereby it may be suspended and a slot extending from the eye in a downward direction, the head having a supporting face concentric with the bottom of the slot.

RAYMOND L. O'CONNOR.